United States Patent
Detry et al.

(10) Patent No.: US 9,238,975 B2
(45) Date of Patent: Jan. 19, 2016

(54) LUBRICATING DEVICE HAVING A BYPASS VALVE

(75) Inventors: Sebastien Detry, Bizanos (FR); Yannick Cazaux, Arbus (FR); Olivier Pierre Descubes, Nay (FR)

(73) Assignee: TURBOMECA, Bordes (FR)

( * ) Notice: Subject to any disclaimer, the term of this patent is extended or adjusted under 35 U.S.C. 154(b) by 421 days.

(21) Appl. No.: 13/880,247

(22) PCT Filed: Oct. 11, 2011

(86) PCT No.: PCT/FR2011/052365
§ 371 (c)(1),
(2), (4) Date: Apr. 18, 2013

(87) PCT Pub. No.: WO2012/052658
PCT Pub. Date: Apr. 26, 2012

(65) Prior Publication Data
US 2013/0205745 A1    Aug. 15, 2013

(30) Foreign Application Priority Data
Oct. 20, 2010    (FR) ...................................... 10 58550

(51) Int. Cl.
*F02C 7/12* (2006.01)
*F01D 25/20* (2006.01)
(Continued)

(52) U.S. Cl.
CPC ................ *F01D 25/20* (2013.01); *F01D 25/32* (2013.01); *F16K 17/046* (2013.01); *F16K 17/0473* (2013.01); *F05D 2220/329* (2013.01); *F05D 2260/602* (2013.01)

(58) Field of Classification Search
CPC ..... F01D 25/16; F01D 25/18; F16N 2210/02; F02C 7/14
See application file for complete search history.

(56) References Cited

U.S. PATENT DOCUMENTS

| 4,452,037 A | 6/1984 | Waddington et al. |
|---|---|---|
| 4,569,196 A | 2/1986 | Waddington et al. |

(Continued)

FOREIGN PATENT DOCUMENTS

| EP | 0 159 772 | 10/1985 |
|---|---|---|
| EP | 2 202 387 A1 | 6/2010 |
| GB | 589 095 | 6/1947 |

OTHER PUBLICATIONS

International Search Report Issued Jun. 3, 2013 in PCT/FR11/052365 Filed Oct. 11, 2011.

(Continued)

*Primary Examiner* — Gerald L Sung
(74) *Attorney, Agent, or Firm* — Oblon, McClelland, Maier & Neustadt, L.L.P.

(57) ABSTRACT

A lubrication device including a bypass valve with an inlet connected to a feed circuit, a first outlet to be connected to elements to be lubricated, and a second outlet connected to a bypass circuit. The valve includes a valve member slidable between first and second positions, and separating a cavity into first and second chambers. The first chamber is connected to the inlet. In the first position, a fluid flow passage from the first chamber to the second chamber is open, and from the first chamber to the first outlet is closed. In the second position, a fluid flow passage from the first chamber to the first outlet is open, and from the first chamber to the second outlet is closed. At least in the second position, the valve member separates the chambers in substantially leak-tight manner, while the second chamber remains in fluid flow communication with the second outlet.

11 Claims, 5 Drawing Sheets

(51) Int. Cl.
*F01D 25/32* (2006.01)
*F16K 17/04* (2006.01)

(56) References Cited

U.S. PATENT DOCUMENTS 5,018,601 A * 5/1991 Waddington et al. .......... 184/6.4
6,058,694 A * 5/2000 Ackerman et al. ........... 60/39.08
6,263,913 B1 7/2001 Kussel

OTHER PUBLICATIONS

International Preliminary Report on Patentability and English translation of Written Opinion issued Nov. 12, 2013, in PCT/FR2011/052365 filed Oct. 11, 2011.

* cited by examiner

LUBRICATING DEVICE HAVING A BYPASS VALVE

The present invention relates to a lubrication device, in particular for a turbine engine, such as, for example, a turbojet, a turboshaft engine, or a turboprop.

In certain machines, in particular in turbine engines, it may be advantageous, or possibly even necessary, to stop, divert, or reduce a flow of lubricant being delivered to certain elements, such as bearing enclosures, when a drive shaft drops below a certain speed. In particular, when the flow of the lubricant through the elements to be lubricated is actuated by two pumps, including a feed pump upstream from the elements to be lubricated and a recovery pump downstream therefrom, there is a possibility of unbalance between the flow rates of the two pumps at low speeds. Such an unbalance, when the feed pump is delivering lubricant at a flow rate greater than that being discharged by the recovery pump can lead to lubricant stagnating in the elements to be lubricated, and to risks of the lubricant coking, which would be harmful for those elements.

The prior art discloses lubrication devices presenting provisions that seek to stop the flow of lubricant upstream from the elements to be lubricated below a certain speed. The devices used include in particular foot valves downstream from the feed pump and anti-siphon devices upstream from the feed pump. Nevertheless, since a sudden interruption of the flow of lubricant could lead to damage in the feed pump if it is still operating when the stop occurs, and since such feed pumps normally disengage only at very low speeds of the drive shaft, the foot valves and anti-siphon devices of the prior art are generally adjusted to stop the flow of lubricant only at a very low speed of the machine to be lubricated, thereby reducing their effectiveness in preventing lubricant accumulating in the elements to be lubricated.

At low speeds, the progressive reduction in the performance of the recovery circuit, compared with the flow rate delivered by the feed circuit, can lead to lubricant stagnating in those elements. When the elements are hot, that runs a risk of the stagnant lubricant coking. Since modern turbine engines operate at ever higher temperatures in order to increase their efficiency, the risk of coking also increases, in particular if a so-called "soak back" phenomenon also occurs in which the elements for lubricating heat up temporarily when the drive shaft is stopped. Such coking can even lead to the lubrication nozzles and/or the oil recovery circuit becoming clogged.

In the prior art, other lubrication devices are disclosed that include devices for avoiding lubricant accumulation at low speeds. Thus, in U.S. Pat. No. 4,170,873, a lubrication device is disclosed that includes a lubricant feed circuit and a lubricant bypass circuit connected to the feed circuit. In order to stop feeding lubricant to the elements to be lubricated before a feed pump in the feed circuit stops, the lubrication system includes on one side a check valve in the feed circuit, downstream from the bypass circuit, and on the other side, in the bypass circuit, a bypass valve arranged to open below a predetermined feed pressure. Thus, when the feed pressure drops below the threshold, the bypass valve opens and the check valve closes so as to divert the lubricant from the feed circuit without passing through the elements to be lubricated. Nevertheless, that prior art lubrication system presents the drawback of having two separate valves, and thus additional complication and two potential sources of failure.

In U.S. Pat. No. 4,245,465, another lubrication device is disclosed that includes a lubricant feed circuit and a bypass circuit connected to the feed circuit. That other lubrication system has a single three-port valve arranged between the feed circuit and the bypass circuit for closing the feed circuit at low speed, and for modulating the bypass flow at higher speeds. Nevertheless, that valve is complex and may present a large amount of hysteresis between the opening and closing thresholds of the feed circuit, and overall that feed circuit does not solve the problem of lubricant stagnating in the elements to be lubricated, since it does not have a recovery pump for discharging that lubricant after the feed circuit has closed.

European patent application EP 2 202 387 A1 discloses several alternative lubrication devices, each having a lubricant feed circuit and a bypass circuit. Each lubrication system also includes, between the feed circuit and the bypass circuit, a valve having an inlet connected to said feed circuit, a first outlet suitable for being connected to elements to be lubricated, a second outlet connected to the bypass circuit, and a valve member housed in a cavity of the valve and separating a first chamber from a second chamber. The first chamber is connected to the inlet, and said valve member is suitable for sliding between a first position and a second position, presenting beside the first chamber a hydraulic actuation surface for urging it towards the second position, and beside the second chamber a hydraulic actuation surface for urging it towards the first position. The valve also has a return actuator for urging the valve member towards the first position. In the first position, a fluid flow passage from the first chamber to the second outlet is open, while a fluid flow passage from the first chamber to the first outlet is closed. In contrast, in the second position, the fluid flow passage from the first chamber to the first outlet is open while the fluid flow passage from the first chamber to the second outlet is closed.

Thus, in the first position of the valve member, since the feed circuit is connected via the inlet to the first chamber of the valve, and the bypass circuit is connected via the second outlet to the second valve chamber, when the feed pressure is sufficiently high relative to the pressure in the bypass circuit, the pressure difference between the two chambers pushes the valve member towards the second position until, in said second position, the fluid flow passage from the first chamber to the second outlet is closed while the fluid flow passage from the first chamber to the first outlet is opened. In this way, sufficient extra pressure in the feed circuit causes the valve member to go from a first position for diverting the flow of lubricant to the bypass, to a second position for feeding the elements to be lubricated.

Similarly, in the second position of the valve member, when the feed pressure drops below a certain threshold relative to the pressure in the second outlet, the return actuator causes the valve member to return towards the first position in which the lubricant is diverted to the bypass.

Nevertheless, the various alternative lubrication devices disclosed in EP 2 202 387 still present certain drawbacks. In particular, each of the valves disclosed presents, through or around the valve member, fluid flow passages between the first and second chambers so as to make it possible, in said first position of the valve member, for lubricant to flow from the first chamber to the second outlet and to the bypass circuit. Those passages can lead to undesirable instability, both while closing and while opening the bypass circuit.

When the feed circuit starts, and once sufficient extra pressure is established in the first chamber, the valve member begins to move from the first position towards the second against the force exerted by the return actuator. The pressure difference between the first and second chambers is then a function of the head loss caused by the flow of lubricant passing through said fluid flow passages between the two chambers. Nevertheless, when the valve member reaches the second position, it shuts off the passage between the second chamber and the second outlet. Since the second chamber is no longer discharging fluid to the second outlet, the pressures in the two chambers equalize via the fluid flow passages connecting them together. The effective area of the hydraulic actuation surface on which the difference between the pressure of the feed circuit and the pressure of the discharge circuit acts is thus suddenly reduced from the sectional area of the valve member, to the substantially smaller sectional area of the second outlet. Under force from the return actuator, the valve member can thus go back in the opposite direction, thereby re-opening the second outlet, thus re-establishing the pressure difference, and so on.

Similarly, when starting from a normal feed speed the pressure drops below a certain threshold, the valve member begins to move from the second position to the first, thereby opening the second outlet and re-establishing the flow of lubricant through the valve member and the second chamber to said second outlet. The pressure in the second chamber ceases to be equal to the pressure in the first chamber and becomes equal to the lower pressure in the second outlet. Thus, the effective area of the hydraulic actuation surface on which the difference between the pressure in the feed circuit and the pressure in the discharge circuit acts therefore increases almost as suddenly from the sectional area of the second outlet to the sectional area of the valve member. If the pressure difference remains sufficiently high, the valve member therefore returns towards the second position, thus re-closing the second outlet, and so the cycle begins again.

That is why the various valves disclosed in EP 2 202 387 present potential instability both when closing and when opening the bypass circuit, with hysteresis between them.

The invention seeks to propose a lubrication device that makes it possible to solve the problem of instability while opening and closing the bypass circuit, and the problem of hysteresis between opening and closure.

This object is achieved by the fact that, in at least one embodiment of the invention, at least in the second position of the valve member, the valve member separates said first and second chambers in substantially leaktight manner, while the second chamber remains in fluid flow communication with the second outlet.

By means of these provisions, neither the arrival of the valve member in the second position, i.e. the feed position, nor its departure from said second position gives rise to a significant change in the pressure in the second chamber, nor does the force exerted on the valve member by the pressure difference between the feed and bypass circuits change significantly. This avoids instability of the valve, both while closing and while opening the bypass circuit.

Advantageously, the lubrication device also includes a lubricant discharge circuit for recovering the lubricant from the elements to be lubricated. In particular, this circuit may include a discharge pump.

Such a discharge circuit serves to discharge the lubricant from the elements to be lubricated so that it can be reused in a closed circuit, and also for removing heat. In addition, this lubricant discharge circuit, in combination with the bypass circuit and valve, serves to limit the quantity of lubricant in the elements to be lubricated when the feed pressure drops below a certain threshold, thus avoiding phenomena associated with excess lubricant or stagnation in those elements, such as leaks or coking. Apart from that, limiting the amount of lubricant in those elements, given that the lubricant is typically combustible, also serves to reduce danger in the event of fire, and that also presents the advantage of reducing the requirements of fire resistance regulations, thus making it possible for the various components involved to be dimensioned less expensively.

Advantageously, the fluid flow passage connecting the first chamber to the second outlet in the first position of the valve member presents greater resistance to flow than the fluid flow passage connecting the first chamber to the first outlet in the second position of the valve member. This ensures a greater head loss in the second position than in the first position, and a pressure difference between the two outlets.

The invention also relates to an apparatus including a rotary shaft with at least one support bearing, and in order to lubricate the bearing, a lubrication device of the invention. In particular, such an apparatus may further include, in the feed circuit, and upstream from the valve, a feed pump actuated by said rotary shaft, so as to ensure that fuel is fed for ensuring that said rotary shaft rotates. In the context of the present invention, the term "actuated" is used to mean both direct mechanical actuation and indirect actuation via a transmission that may be mechanical, hydraulic, pneumatic, or electrical. Advantageously, the lubrication device may then be calibrated so that a speed of rotation of the rotary shaft at which the valve member reaches the second position during an increase in speed lies in a range 20% to 35% of a nominal speed of the rotary shaft, and/or so that a speed of rotation of the rotary shaft at which the valve member returns to the first position during a decrease in speed lies in a range 15% to 30% of a nominal speed of the rotary shaft. By ceasing to feed lubricant at a speed of rotation that is still relatively high, it can be more certainly avoided that lubricant accumulates at low speed.

The present invention also provides a turbine engine, including such apparatus, in particular for an aircraft such as a helicopter. Such an engine presents constraints concerning speed of rotation, reliability, lubrication, and fire safety that are particularly strict, thus constituting a context that makes use of the invention particularly advantageous.

The invention can be well understood and its advantages appear better on reading the following detailed description of embodiments given as non-limiting examples. The description refers to the accompanying drawings, in which.

Figure 1:
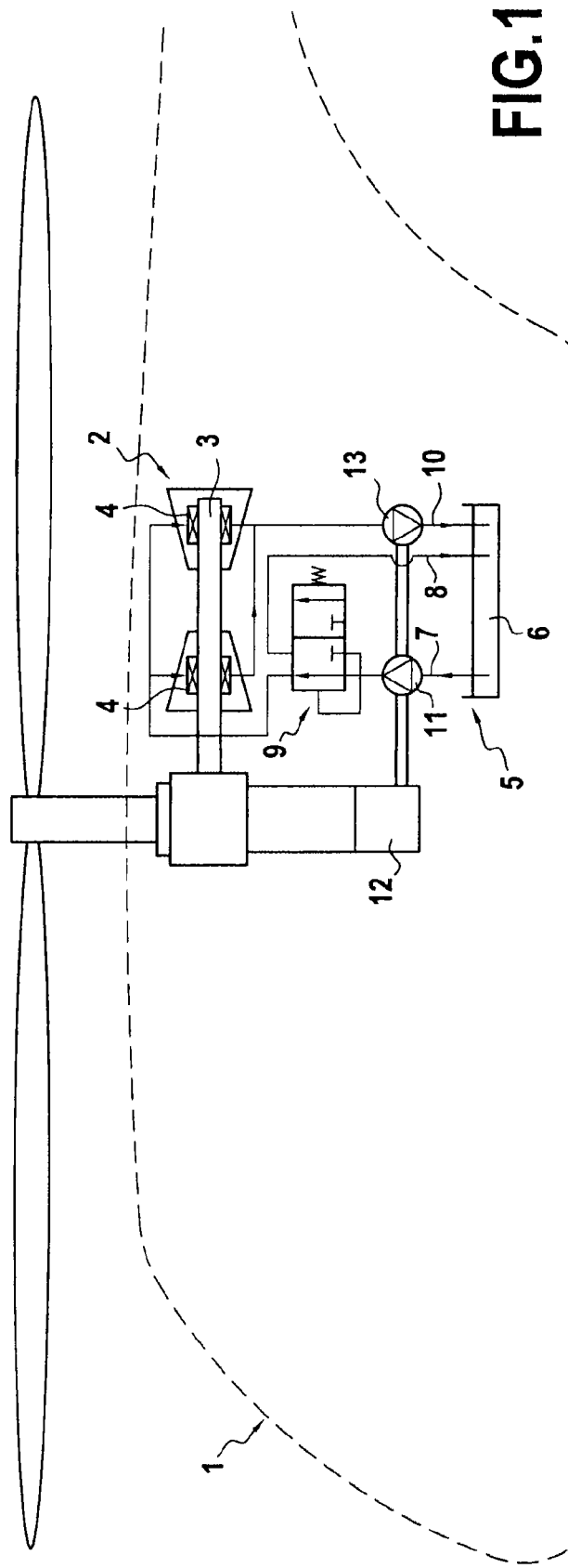
FIG. 1 is a diagram of an aircraft propelled by a turboshaft engine with a lubrication device according to a first embodiment of the invention.

FIG. 1 is a diagram of an aircraft, more particularly a helicopter 1, having a turboshaft engine 2 with a rotary drive shaft 3 supported by bearings 4, and a lubrication device 5 for lubricating said bearings 4.

The lubrication device 5 comprises a tank of lubricant 6, a feed circuit 7 for feeding lubricant to the bearings 4, a bypass circuit 8, a valve 9 interposed between the feed circuit 7 and the bypass circuit 8, and a discharge circuit 10 for discharging lubricant from the bearings 4. The feed circuit 8 includes a positive displacement feed pump 11 driven by the drive shaft 3 via an accessory gearbox (AGB) 12. The discharge circuit 10 includes a discharge pump 13, likewise a positive displacement pump and driven by the drive shaft 3 via the AGB 12. The feed and discharge pumps 11 and 13 are thus normally coordinated to cause substantially the same flow rate to flow and, at least at a nominal speed, to avoid the bearings 4 accumulating lubricant or being short of lubricant.

Nevertheless, at low speeds, it is no longer possible to guarantee that those flow rates remain the same. In particular, there is a risk of lubricant accumulating or stagnating in the bearings 4. To avoid that, the lubrication device 5 includes a bypass valve 9 controlled by the feed pressure. This valve 9 is a three-port and two-position valve, with an inlet IN connected to the feed circuit 7, a main outlet M connected to the bearings 4 in order to feed them with lubricant, and a second output BP to cause lubricant to take the bypass circuit 8 to the tank 6, either directly as shown, or else indirectly, e.g. via the AGB 12.

Figure 2A:
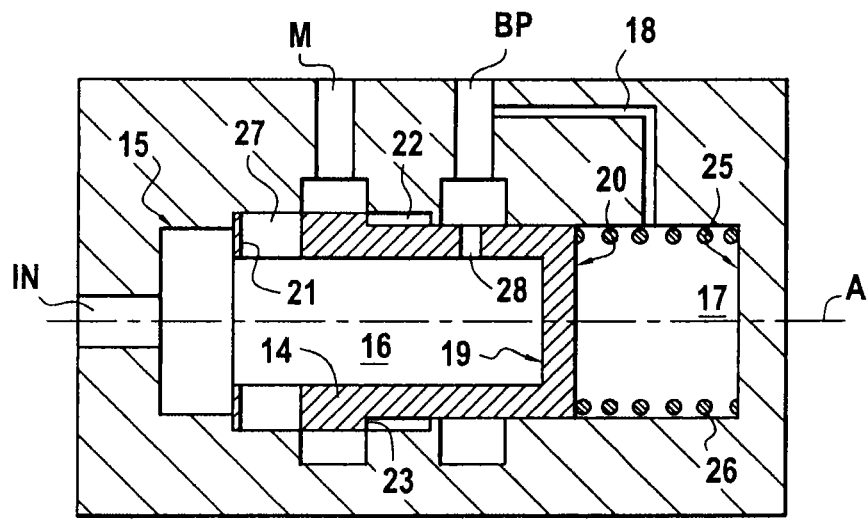
FIG. 2A is a longitudinal section view of the bypass valve of the FIG. 1 lubrication device, with the valve member in a first position.
Figure 2B:
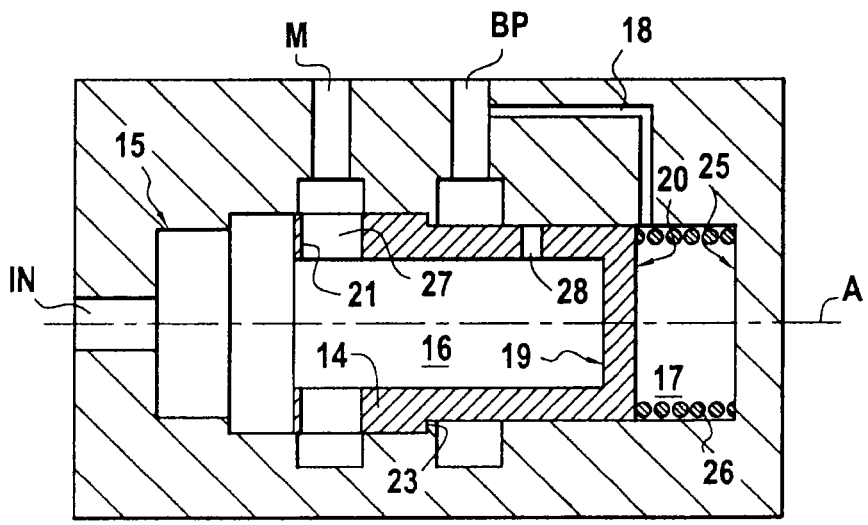
FIG. 2B is another longitudinal section view of the (FIG. 2A) of valve, with the valve member in a second position.

A first variant of the valve 9 is shown in FIGS. 2A and 2B. The valve 9 shown is of the "slide valve" type with a valve member 14 that slides along an axis A between two positions in a cavity 15 of the valve 9. In this cavity 15, the valve member 14 defines two chambers 16 and 17, the first being in fluid-flow communication with the inlet IN and the second being in fluid-flow communication via a drain 18 with the second outlet BP of the valve 9. The valve member 14 separates the chambers 16 and 17 in substantially leaktight manner, and presents beside the first chamber 16 a hydraulic actuation surface 19 for urging the valve member towards the second position, i.e. in the embodiment shown, towards the second chamber 17. The valve member 14 also presents, beside the second chamber 17, a hydraulic actuation surface 20 for actuating the valve member towards the first position, i.e. in the embodiment shown, towards the first chamber 16. The cavity 15 presents a first stop 21 defining the first position of the valve member 14, and a second stop 22 in the form of a shoulder that is opposite from the first stop and that co-operates with a complementary shoulder 23 on the valve member 14 to determine the second position of the valve. A return actuator 26, in the form of a resilient spring bearing against an end wall 25 of the cavity 15 urges the valve member 14 towards the first position.

The inlet duct IN lies substantially on the sliding axis A. However, the ducts of the two outlets M and BP are substantially perpendicular to said sliding axis A. The valve member 14 has two orifices 27 and 28 respectively in alignment with the first outlet M while in the second position, and with the second outlet BP while in the first position, so as to put the first chamber 16 of the cavity 15 into fluid flow communication with a respective one of the outlets M or BP. The second orifice 28 is narrower than the first orifice 27 so as to restrict the flow of lubricant to a greater extent.

In operation, so long as the pressure at the inlet IN remains too low to move the valve member 14 against the force from the spring 26, the valve member 14 remains in the first position, as shown in FIG. 2A, with the first outlet M closed by the valve member 14 and the second orifice 28 of the valve member 14 in alignment with the second outlet BP, so as to divert substantially all of the flow of lubricant to the bypass circuit 8. Because of the restricted size of the orifice 28, as soon as there is any flow of lubricant, the head loss through the orifice 28 ensures that the pressure in the second outlet BP is lower than at the inlet IN. Since the first chamber 16 is directly connected to the inlet IN, and the second chamber 17 is connected to the second outlet BP via the drain 18, a pressure difference Δp is established between the two chambers 16 and 17 that are separated by the valve member 14 in substantially leaktight manner.

Starting from a pressure or a flow rate at the inlet IN that corresponds to a higher predetermined speed of rotation of the drive shaft, the pressure difference Δp becomes sufficient to move the valve member 14 towards the second position as shown in FIG. 2B against the return force of the actuator 26. Thus, the first orifice 27 of the valve member 14 moves progressively into alignment with the first outlet M, gradually opening the fluid flow passage from the inlet IN and the first chamber 16 towards this first outlet M. When the valve member 14 reaches the second position shown in FIG. 2B, substantially all of the flow of lubricant delivered by the feed circuit 17 via the inlet IN of the valve 9 is transmitted to the bearings 4 in order to lubricate them. The second orifice 28 of the valve member 14 is no longer in alignment with the duct of the second outlet BP, so the fluid flow passage between the first chamber 16 and the second outlet BP is shut off. In contrast, fluid flow communication between the second outlet BP and the second chamber 17 is maintained via the drain 18. Thus, the pressure acting on the entire hydraulic actuation surface 20 remains the pressure at the second outlet BP.

If the feed pressure or flow rate drop below a predetermined threshold, e.g. because the speed of the drive shaft 3 driving the pumps 11 and 13 decreases, the pressure difference Δp between the two chambers 16 and 17 once more becomes too small to hold the valve member 14 in its second position against the return force from the spring 26. Consequently, the valve member 14 returns towards its first position shown in FIG. 2A, progressively re-closing the passage to the first outlet M while re-opening the passage to the second outlet BP and to the bypass circuit 10.

Thus, during a prolonged stop of the engine 2, when the speed of rotation of the drive shaft 3 drops below a predetermined value, the flow rate delivered by the feed pump 11 is no longer sufficient to maintain a pressure difference Δp between the two chambers 16 and 17 that is sufficient to hold the valve member 14 in its second position, and the flow of lubricant delivered by the feed circuit 7 is diverted to the bypass circuit. However, since the discharge pump 13 continues to discharge lubricant from the bearings 4 via the discharge circuit 10, the lubrication device 5 also limits the quantity of lubricant that remains in the bearings 4 after the engine has stopped, thereby avoiding coking and leaks, and eliminating the fire risk caused by such lubricant being present in the bearings 4. In particular, because of the valve 9, the equipment downstream from the outlet M of the valve 9 can be given a fire resistance certification in compliance with the EASA CS-E 570 standard that can be reduced to a 5-minute test ("fire resistant"), instead of a 15-minute test ("fireproof").

Other variants of the valve 9 for alternative embodiments of a lubrication device of the invention are shown in FIGS. 3A to 4B.

Figure 3A:
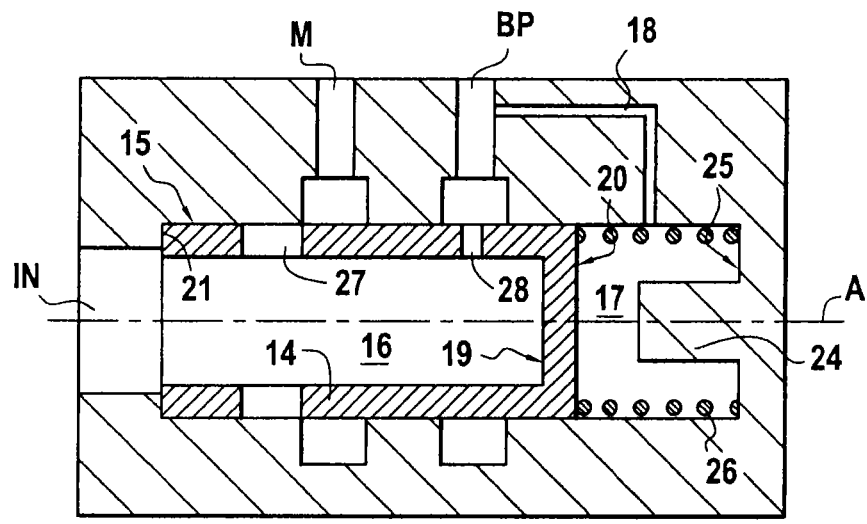
FIG. 3A is a longitudinal section of the bypass valve of a lubrication device in a second embodiment of the invention, with the valve member in a first position.
Figure 3B:
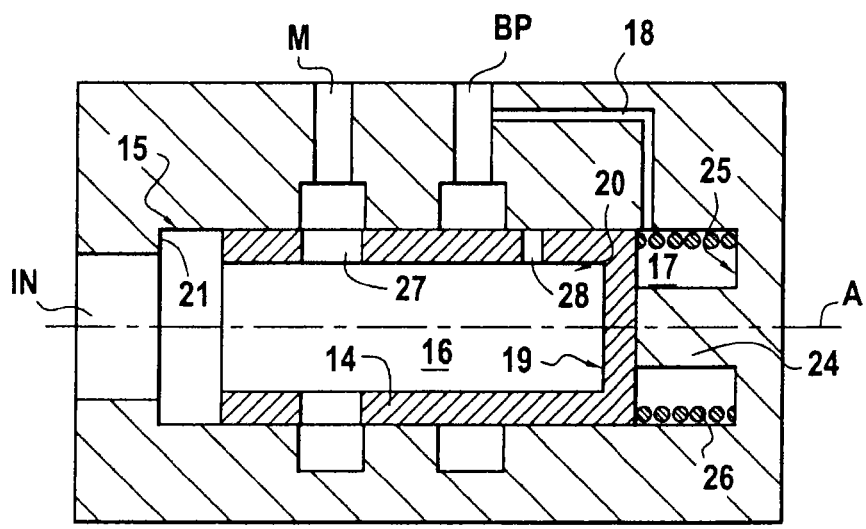
FIG. 3B is another longitudinal section view of the (FIG. 3A) of valve, with the valve member in a second position.

The valve 9 shown in FIGS. 3A and 3B is essentially equivalent to that shown in FIGS. 2A and 2B, and corresponding elements in this valve are given the same reference numbers in the drawings. The valve 9 differs from the valve in the first embodiment mainly in that neither the valve member 14 nor the bore of the cavity 15 presents a shoulder, thereby simplifying production. In its first position, shown in FIG. 3A, the valve member 14 is in abutment against the stop 21, while in its second position, shown in FIG. 3B, it is in abutment against a protuberance 24' formed on the end wall 25 of the cavity 15. Its operation is identical to that of the valve shown in FIGS. 2A and 2B, and it can be used in the same manner in the lubrication device 5 of FIG. 1.

Figure 4A:
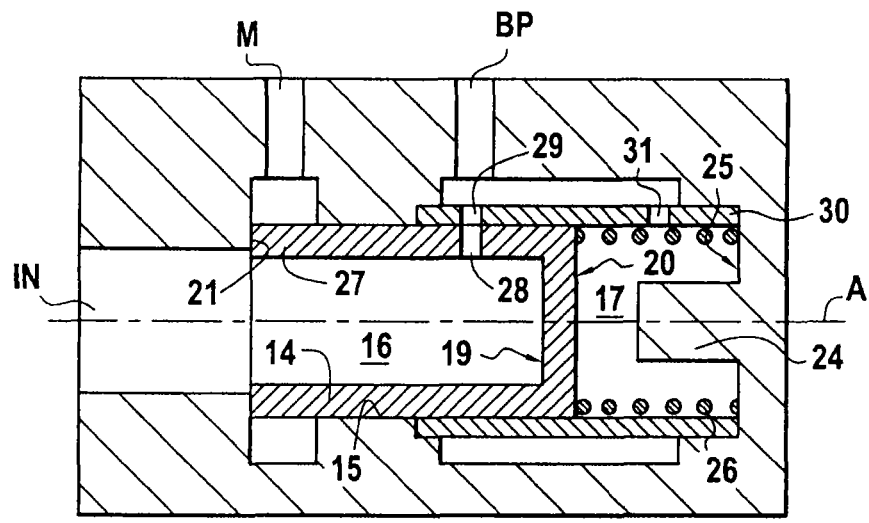
FIG. 4A is a longitudinal section of the bypass valve of a lubrication device in a third embodiment of the invention, with the valve member in a first position.
Figure 4B:
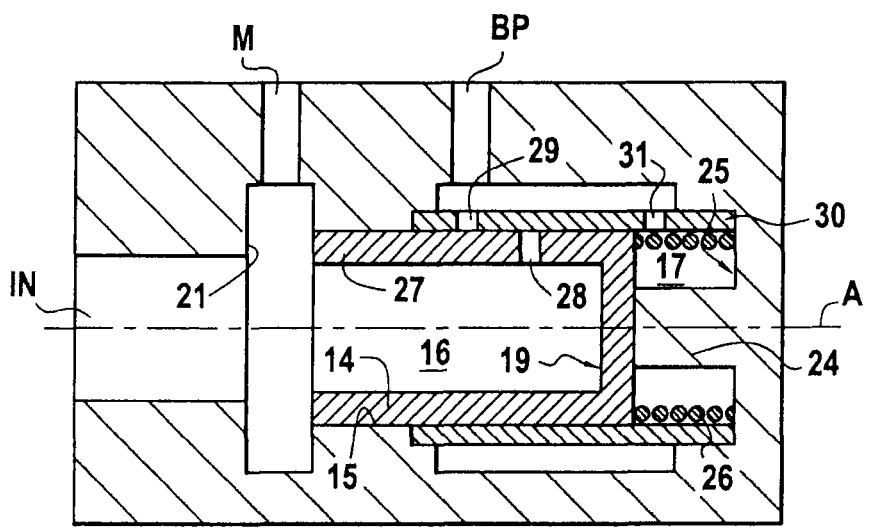
FIG. 4B is another longitudinal section view of the (FIG. 3A) of valve, with the valve member in a second position.

The valve 9 shown in FIGS. 4A and 4B is also essentially equivalent to that shown in FIGS. 2A and 2B, and corresponding elements in this valve are given the same reference numbers in the drawings. This third variant of the valve 9 is further simplified relative to the second variant. In particular, the valve member 14 has only one radial orifice 28 that is aligned in the first position shown in FIG. 4A with a corresponding orifice 29 in a jacket 30 received in an enlarged bore of the cavity 15. This enlarged bore is in fluid flow communication with the second outlet BP of the valve 9 so that when, in said first position, the orifice 28 of the valve member 14 and the orifice 29 of the jacket 30 are in alignment, they put the first chamber 16 of the valve 9 into fluid flow communication with said second outlet BP. The jacket 30 also has a second orifice 31 for putting the second chamber 17 into fluid flow communication with the second outlet BP, even in the second position of the valve member 14 as shown in FIG. 4B. In this second position, the movement of the valve member 14 relative to the first position serves to release the fluid flow passage from the first chamber 16 to the first outlet M of the valve 9. Consequently, the operation of this valve 9 is also essentially equivalent to that of the first two variants, and it may be used in the same manner in the lubrication device 5 of FIG. 1.

Figure 5:
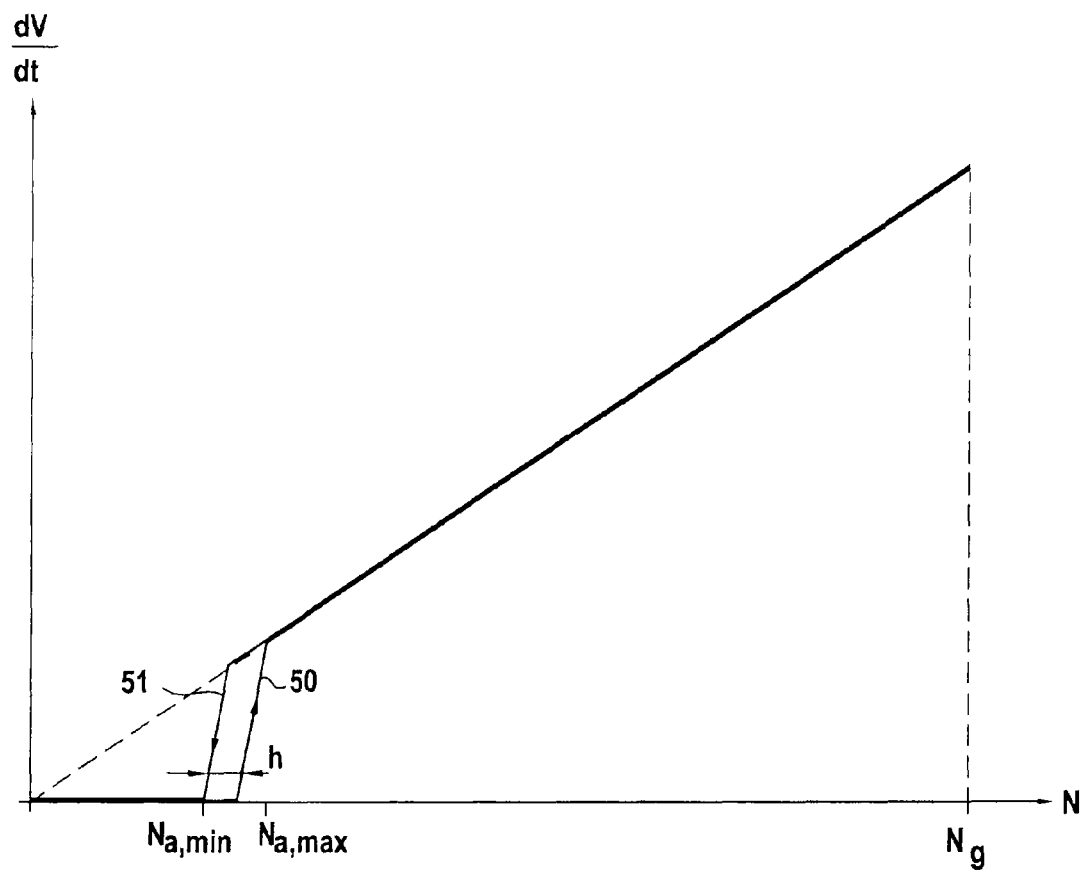
FIG. 5 is a graph plotting the rate at which lubricant is fed by a lubrication device in any of the embodiments shown, as a function of feed pressure.

Thus, as shown by the graph of FIG. 5, each of these three variants of the valve 9 makes it possible to supply the bearings 4 of the engine 2 with lubricant at a flow rate dV/dt that is a function of the speed of rotation N of the drive shaft 3, with minimal hysteresis h between the curve 50 for increasing engine speed and the curve 51 for decreasing engine speed, in a range for transition between a minimum speed $N_{a,min}$ at which the outlet M of the valve 9 is completely closed, and a speed $N_{a,max}$ at which the outlet M of the valve 9 is completely open. The speed $N_{a,min}$ preferably lies in a range 15% to 30% of the nominal speed $N_g$ of the engine 2, and $N_{a,max}$ may lie in a range of 20% to 35% of the nominal speed $N_g$ of the engine 2.

Although the present invention is described above with reference to specific embodiments, it is clear that various modifications and changes may be implemented on those examples without going beyond the general scope of the invention as defined by the claims. In particular, isolated characteristics and elements of the various embodiments shown may be combined in novel embodiments. Consequently, the description and the drawings should be considered as having an illustrative purpose rather than a restrictive purpose.

The invention claimed is:

1. A lubrication device comprising:
   a lubricant feed circuit;
   a bypass circuit; and
   a valve interposed between the feed circuit and the bypass circuit and comprising:
      an inlet connected to the feed circuit;
      a first outlet configured to be connected to elements to be lubricated;
      a second outlet connected to the bypass circuit;
      a valve member housed in a cavity of the valve and separating a first chamber from a second chamber, the first chamber being connected to the inlet, the valve member being configured to slide between a first position and a second position, and presenting, beside the first chamber, a hydraulic actuation surface for urging the valve member towards the second position, and, beside the second chamber, a hydraulic actuation surface for urging the valve member towards the first position; and
      an actuator for returning the valve member towards the first position; wherein
   in the first position, a fluid flow passage from the first chamber to the second outlet is open, while a fluid flow passage from the first chamber to the first outlet is closed; and
   in the second position, the fluid flow passage from the first chamber to the first outlet is open, while the fluid flow passage from the first chamber to the second outlet is closed;
   wherein at least in the second position, the valve member separates the first and second chambers in substantially leaktight manner, while the second chamber remains in fluid flow communication with the second outlet.

2. A lubrication device according to claim 1, wherein the lubricant feed circuit includes a feed pump arranged upstream from the valve.

3. A lubrication device according to claim 1, further comprising a lubricant discharge circuit for recovering lubricant from the elements to be lubricated.

4. A lubrication device according to claim 3, wherein the lubricant discharge circuit includes a discharge pump.

5. A lubrication device according to claim 1, wherein the fluid flow passage connecting the first chamber to the second outlet in the first position presents greater resistance to flow than the fluid flow passage connecting the first chamber to the first outlet in the second position.

6. An apparatus comprising:
   a rotary shaft including at least one support bearing; and
   a lubrication device according to claim 1 for lubricating the at least one bearing.

7. Apparatus according to claim 6, further comprising, in the feed circuit, upstream from the valve, a feed pump actuated by the rotary shaft.

8. Apparatus according to claim 7, calibrated so that a speed of rotation of the rotary shaft at which the valve member reaches the second position during an increase in speed lies in a range 20% to 35% of a nominal speed of the rotary shaft.

9. Apparatus according to claim 7, calibrated so that a speed of rotation of the rotary shaft at which the valve member returns to the first position during a decrease in speed lies in a range 15% to 30% of a nominal speed of the rotary shaft.

10. Apparatus according to claim 6, further comprising a lubricant discharge circuit downstream from the bearing with at least one discharge pump driven by the rotary shaft.

11. A turboshaft engine comprising an apparatus according to claim 6.

* * * * *